United States Patent [19]

Face, Jr. et al.

[11] 4,414,747
[45] Nov. 15, 1983

[54] SURFACE DEVIATION MEASURING DEVICE

[76] Inventors: Samuel A. Face, Jr.; Samuel A. Face, III, both of P.O. Box 6341, Norfolk, Va. 23508

[21] Appl. No.: 292,145

[22] Filed: Aug. 12, 1981

[51] Int. Cl.³ .......................... G01B 7/28; G01B 7/34
[52] U.S. Cl. .................................. 33/174 P; 33/1 LE
[58] Field of Search .............. 33/1 LE, 174 L, 174 P, 33/174 Q, DIG. 7, DIG. 13

[56] References Cited

U.S. PATENT DOCUMENTS

| 3,208,151 | 9/1965 | Rawstron | 33/174 P |
| 4,135,304 | 1/1979 | Kuntz | 33/1 LE |
| 4,213,245 | 7/1980 | Armstrong | 33/DIG. 7 |

FOREIGN PATENT DOCUMENTS

| 216283 | 7/1968 | U.S.S.R. | 33/174 P |
| 607103 | 5/1978 | U.S.S.R. | 33/1 LE |

Primary Examiner—Richard R. Stearns
Attorney, Agent, or Firm—Harvey B. Jacobson

[57] ABSTRACT

A pair of elongated, rigid electrical rods held by a frame in fixed parallel spaced relation to each other are connected to an ohmmeter circuit to measure linear resistance along one of the rods from a taut datum wire in contact with the rods. The other of the rods has a nonconductive pivot element at one end positioned in contact with a test surface at a point intersected by an axis parallel to said rods about which the frame is angularly displaced to bring the rods into gripping contact with the datum wire.

11 Claims, 7 Drawing Figures

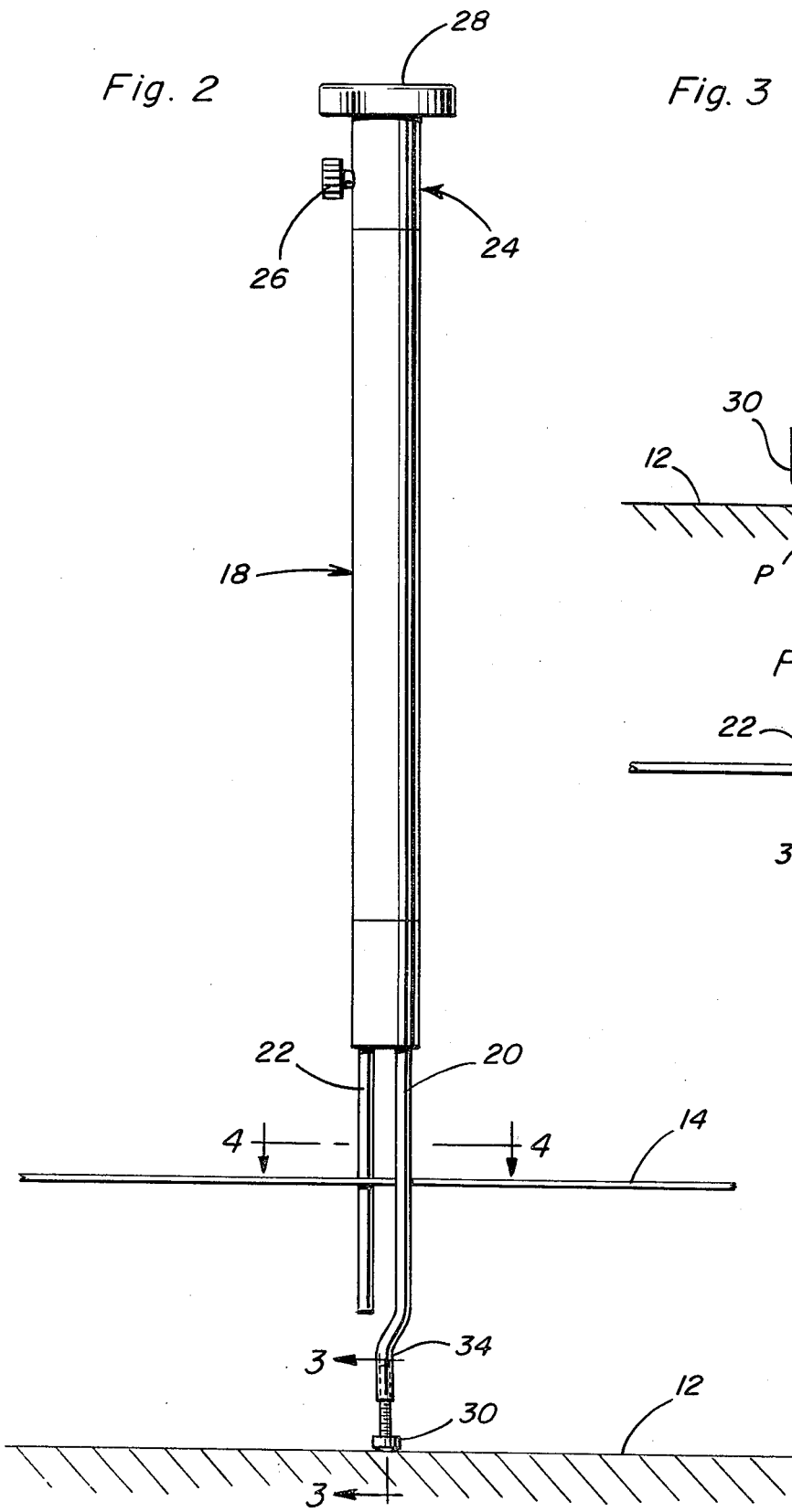
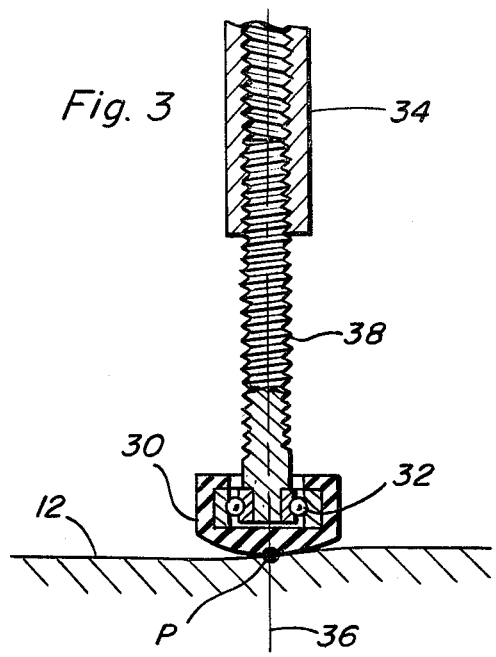
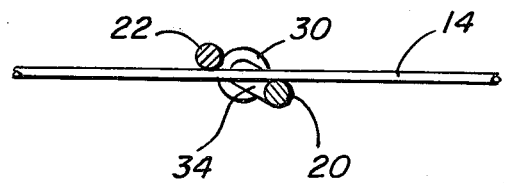

SURFACE DEVIATION MEASURING DEVICE

BACKGROUND OF THE INVENTION

This invention relates to the testing of construction surfaces such as horizontal concrete slabs and roadways or vertical building walls and columns.

The detection of irregularities in test surfaces by relatively massive mobile apparatus is already well known as disclosed, for example, in U.S. Pat. Nos. 3,266,302, 3,453,877 and 3,470,739. According to U.S. Pat. No. 3,266,302, irregularities are detected by displacement of a potentiometer wiper mounted on a wheeled vehicle frame. According to U.S. Pat. No. 3,470,739, a feeler rod projecting from a measuring unit engages the test surface as the unit is guided for movement along a path parallel to a reference surface. Electrical calculating circuits are utilized to measure displacement of the wiper or feeler rod according to the latter two patents. A mechanical measuring system is utilized according to U.S. Pat. No. 3,453,877. Rather complex measuring arrangements are featured in the foregoing patents, subject to many sources of error and relatively costly to produce.

It is therefore an important object of the present invention to provide a relatively simple, versatile and less massive tool for detecting irregularities in a test surface.

SUMMARY OF THE INVENTION

In accordance with the present invention, a test surface, whether it be horizontal or vertical, has a taut datum wire positioned generally parallel thereto in relatively close spaced relation. A measuring tool is moved along the test surface and at any desired location the tool is locked to the datum wire in order to render an electrical meter device associated therewith operative to provide an impedance reading corresponding to such location from which deviations from the reference established by the datum wire may be detected.

The measuring tool includes a pair of rigid electrical rods held in fixed parallel spaced relation to each other by an elongated supporting frame. One of the rods is an electrical conductor connected to the meter device and has a non-conductive element pivotally connected to one end for engagement with the test surface. The tool frame may be held in a position with the non-conductive element engaging the test surface and the rods perpendicular to the datum wire. The non-conductive pivot element in contact with the test surface also establishes a rotational axis between the rods about which the frame may be rotated manually to bring the rods into gripping engagement with the datum wire. Electrical contact between the rods is thereby established to render the meter device operative to measure linear ohmic resistance along the other rod acting as a potentiometer with the datum wire as its wiper.

The measuring tool may be adjusted and calibrated to provide an output reading of zero whenever the test surface conforms exactly to the desired design spacing from the datum wire. A simple manual twist imparted to the tool frame locks the tool to the datum wire in a measuring position and switches on an ohmmeter circuit in order to provide an accurate and stable reading at any desired location along the test surface.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

FIG. 2 is an enlarged side elevation view of a portion of the installation shown in FIG. 1.

FIG. 3 is an enlarged partial section view taken substantially through a plane indicated by section line 3—3 in FIG. 2.

FIG. 4 is a partial transverse section view taken substantially through a plane indicated by section line 4—4 in FIG. 2.

DETAILED DESCRIPTION OF PREFERRED EMBODIMENTS

Figure 1:
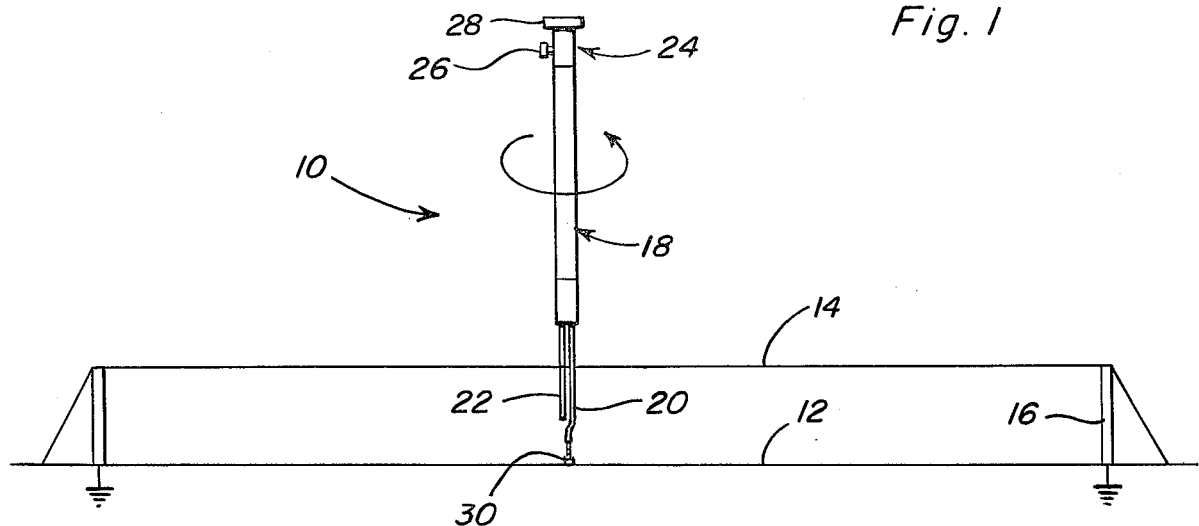
FIG. 1 is a side elevation view of the apparatus of the present invention in accordance with one installational embodiment.

Referring now to the drawings in detail, FIG. 1 illustrates a surface testing tool generally referred to by reference numeral 10 being applied to a horizontal test surface 12, such as a concrete slab. A reference line is established by a datum wire 14 held by grounding anchors 16 in a taut condition closely spaced above a portion of the surface 12. The datum wire is electrically conductive for reasons which will become apparent hereinafter.

The tool 10 includes an elongated, cylindrical supporting frame 18 adapted to be grasped in the hand and preferably made of an electrically non-conductive material in the illustrated embodiment. A pair of rigid, electrical rod elements 20 and 22 project from one longitudinal end of frame 18 and are held in adjustably fixed, parallel spaced relation to each other. The other end of the housing mounts an impedance measuring meter device 24 having an adjustment knob 26 associated therewith and a meter registering display 28, preferably of the digital reading type. A positioning element 30 is pivotally connected to the end of rod element 20 remote from frame 18 for engagement with the test surface of any desired location along the datum wire 14. The tool may thereby be positioned in contact with the surface 12 and held perpendicular to the datum wire 14 which extends between the rod elements 20 and 22 as shown.

As more clearly seen in FIGS. 2, 3 and 4, the positioning element 30 is mounted by means of a pivot bearing 32 on a laterally offset end section 34 of the rod element 20 in order to establish a rotational axis 36, intersecting the surface 12 at contact point P, about which the tool may be manually rotated. The axis 36 extends parallel to and between the rod elements 20 and 22 so that they may be angularly displaced to a locking and measuring position, as shown in FIG. 4, gripping the datum wire to prevent shift of the tool from a vertical position perpendicular to the datum wire at any desired location along the test surface 12. If desired, the positioning element may be mounted through pivot bearing 32 on section 34 by means of a threaded adjustment screw 38, as more clearly seen in FIG. 3, to adjust the effective length of rod 20 relative to rod 22. The element 30 is made of electrically non-conductive material for reasons which will become apparent hereinafter.

Figure 5:
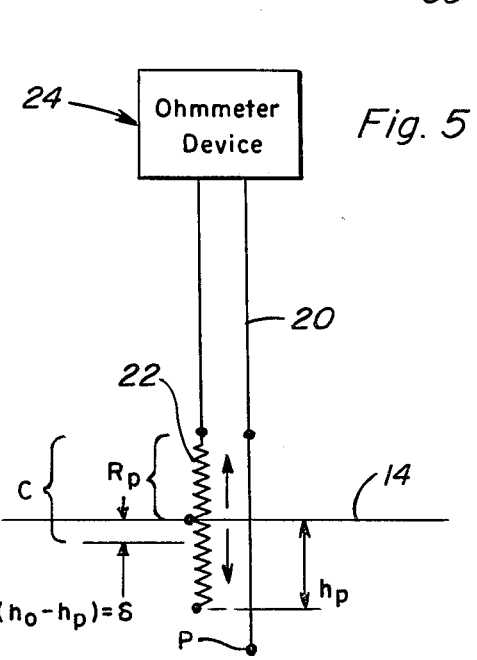
FIG. 5 is an electrical schematic view corresponding to the arrangement shown in FIG. 2.
Figure 6:
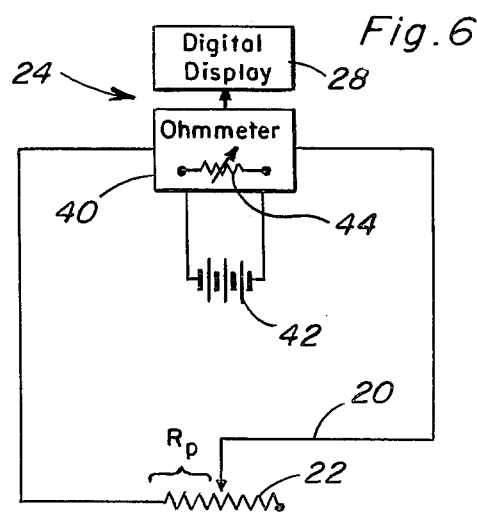
FIG. 6 is a simplified electrical circuit diagram conforming to FIGS. 2 and 5.

The tool 10 in the installation shown in FIGS. 1-4 is represented electrically in FIG. 5. The rod element 20 is an electrical conductor insulated at its lower end at surface contacting point P by the electrically non-conductive material of element 30 and connected at its other end to the meter device 24. Also electrically connected to the meter device is the rod element 22 which is made of a material having a linear electrical resistance property. With the rod element held in gripping engagement with the datum wire 14, as shown in FIG. 5, an electrical connection is established between the conductor rod 20 and the resistor rod element 22, as represented in FIG. 5. Thus, the datum wire 14 acts as a wiper element of a potentiometer, the resistance of which is formed by the linear resistance material of the rod element 22. Further, the electrical contact established by angular displacement of the rod elements 20 and 22 into engagement with the datum wire 14 operates to switch on the meter device 24 to which the rod elements are electrically connected. The meter device 24 may take any suitable form already well known in the art for measuring the ohmic resistance from a point on rod 22 engaged by the datum wire 14. As diagrammatically shown in FIG. 6, the meter device includes a calculation circuit portion 40 powered by a suitable source of electrical energy, such as battery 42, and being provided with an adjustable resistor 44 to which the adjustment knob 26, aforementioned, is connected. The output of the calculation circuit 40 is registered by the digital display 28.

The displayed output reading (M) of the meter device is arranged to be zero when the datum wire 14 is at a design spacing distance from the test surface 12. Zeroing adjustment and calibration of the meter device 24 is therefore effected by physical adjustment of the rod elements relative to each other, using, for example, the adjustment screw 38 and/or adjustment of the ohmmeter calculation circuit through the adjustment knob 26. Accordingly, any deviation from the zero setting by displacement of the datum wire 14 along the rod 22 will produce an output reading on the digital display 28 in accordance with the following expression:

$$M = (R_p - C)/r,$$

where $(R_p)$ is the circuit resistance at any given location of the tool along the test surface, (C) is an adjusted constant of the ohmmeter calculation circuit, and (r) is the resistance per unit length of the resistor rod 22. The parameters of the foregoing formula are denoted in FIG. 5, wherein $(h_p)$ is the distance between the taut datum wire 14 and the test point (P) on the test surface, and $(H_o)$ is a preset distance between the datum wire and the desired design grade of the test surface or standard reference wire height. Thus, the output reading of the meter device may be calibrated to provide a direct indication of the deviation of the test point (P) on the test surface from the desired design level.

The datum wire 14 is installed at the desired design level above the test surface by use of a transit or laser device. The tool is then adjusted or zeroed as aforementioned, utilizing a standard zeroing model in which a short section of taut conductive wire is precisely located above a reference surface. The tool is then moved to different locations along the test surface 12 at which readings are obtained. Any positive reading will indicate that the test surface is above the desired grade, while negative readings will indicate that it is below the desired grade.

Figure 7:
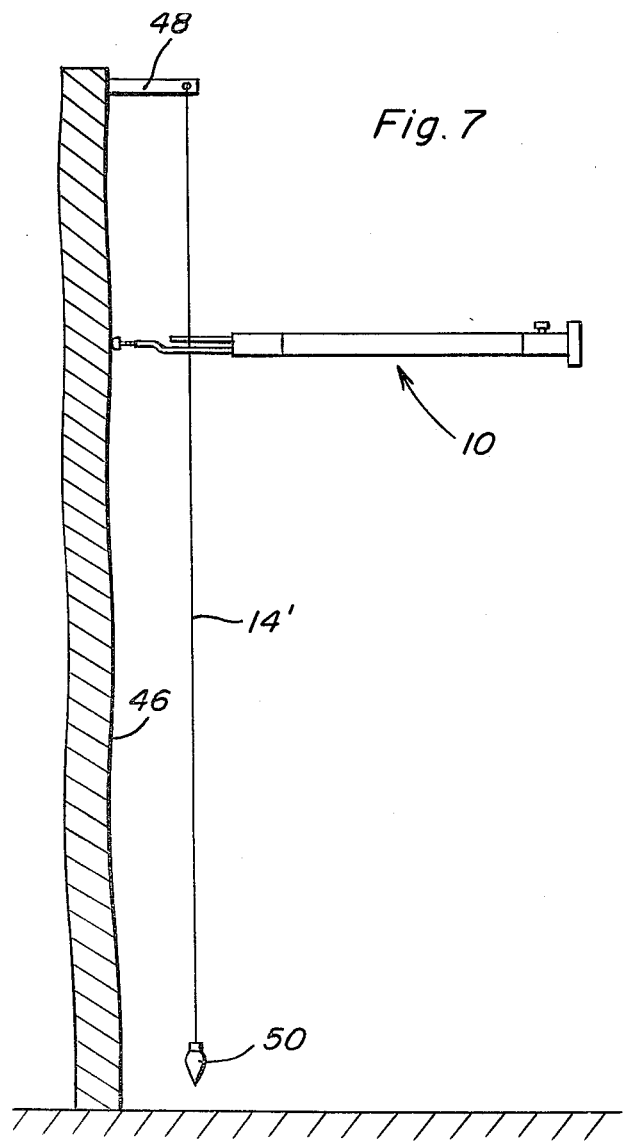
FIG. 7 is a side elevation view of the apparatus in another installational embodiment.

The tool 10 may also be utilized to test a vertical surface 46, as shown in FIG. 7. In such case, the datum wire 14 is suspended from an anchor 48 and is held in a taut condition by a plumb weight 50. The tool 10 is utilized in the same manner as hereinbefore indicated with respect to FIGS. 1-5. At any desired location along the test surface 46, the tool is positioned normal to or perpendicular to the datum wire 14, and by a simple manual twist the rod elements 20 and 22 are brought into gripping engagement with the datum wire in order to switch on the ohmmeter device and obtain a reading.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for detecting deviations in spacing of a test surface from an elongated datum element, comprising a pair of parallel spaced rods, one of said rods being an electrical conductor and the other of the rods being an electrical resistor, supporting frame means for holding the rods in fixed relation to each other, positioning means mounted on one of the rods and engageable with the test surface for establishing a rotational axis perpendicular to said datum element, and meter means electrically connected to said rods for measuring impedance along the other of the rods from the datum element in response to angular displacement of the frame means about said rotational axis to a measuring position in which the rods engage the datum element.

2. The combination of claim 1, wherein said meter means is rendered operative in the measuring position by electrical contact of the rods with the datum element.

3. The combination of claim 2, wherein said other of the rods has a linear ohmic resistance.

4. The combination of claim 3, wherein said positioning means comprises a laterally offset end section connected to said one of the rods, a non-conductive engaging element, and pivot means mounting the non-conductive element on said laterally offset end section for rotation of the frame means about the rotational axis extending through the laterally offset end section between the rods.

5. The combination of claim 4, wherein said datum element is an electrically conductive wire.

6. The combination of claim 5, wherein said test surface is horizontal, and spaced anchoring means secured to the surface between which the wire extends in a taut condition.

7. The combination of claim 5, wherein said test surface is vertical, and anchoring means secured to the surface from which the wire is suspended in a taut condition.

8. The combination of claim 1, wherein said one of the rods is an electrical conductor and the other of the rods has a linear ohmic resistance.

9. The combination of claim 1, wherein said positioning means comprises a laterally offset end section connected to said one of the rods, a non-conductive engaging element, and pivot means mounting the non-conductive element on said laterally offset end section for rotation of the frame means about the rotational axis extending through the laterally offset end section between the rod.

10. In combination with an ohmmeter adapted to measure resistance representing the spacing between a test surface and an electrically conductive datum line, a pair of rigid, elongated electrical elements connected to the ohmmeter, supporting frame means for holding the elements in fixed parallel spaced relation to each other, and non-conductive means pivotally connected to one of the elements and engageable with the test surface for positioning the elements in substantially perpendicular relation to the datum line extending therebetween, whereby the frame means is angularly displaceable to a measuring position in which the elements engage the datum line.

11. In combination with electrical meter means for measuring resistance representing the spacing between a test surface and an electrically conductive datum line, a pair of elongated electrical elements connected to the meter means, supporting frame means for holding the elongated electrical elements in spaced relation to each other, and non-conductive means pivotally connected to one of the elements and engageable with the test surface for establishing a pivot on the test about surface about which the frame means is angularly displaceable to a measuring position in which the elements engage the datum line extending therebetween.

* * * * *